US007835776B2

(12) United States Patent
Boyle et al.

(10) Patent No.: US 7,835,776 B2

(45) Date of Patent: Nov. 16, 2010

(54) WIRELESS TERMINAL

(75) Inventors: Kevin R. Boyle, Horsham (GB); Peter J. Massey, Horley (GB); Roger Hill, Horley (GB)

(73) Assignee: NXP B.V., Eindhoven (NL)

( * ) Notice: Subject to any disclaimer, the term of this patent is extended or adjusted under 35 U.S.C. 154(b) by 1043 days.

(21) Appl. No.: 09/912,470

(22) Filed: Jul. 25, 2001

(65) Prior Publication Data

US 2002/0037739 A1 Mar. 28, 2002

(30) Foreign Application Priority Data

Aug. 8, 2000 (GB) ................................ 0019335.9
Apr. 10, 2001 (GB) ................................ 0108899.6

(51) Int. Cl.
*H04M 1/00* (2006.01)
*H01Q 1/00* (2006.01)

(52) U.S. Cl. ................ 455/575.7; 455/90.3; 455/575.1; 343/729; 343/767; 343/700 MS

(58) Field of Classification Search ................ 455/90.3, 455/575.7, 575.1; 343/729, 767, 746, 700 MS
See application file for complete search history.

(56) References Cited

U.S. PATENT DOCUMENTS 4,491,843 A 1/1985 Boubouleix ................. 343/702
4,907,006 A * 3/1990 Nishikawa et al. ..... 343/700 MS
5,017,932 A * 5/1991 Ushiyama et al. ........... 343/702
5,764,190 A * 6/1998 Murch et al. ................ 343/702
5,767,810 A * 6/1998 Hagiwara et al. ...... 343/700 MS
5,903,822 A 5/1999 Sekine et al. ................. 455/89
5,912,647 A * 6/1999 Tsuru et al. ........... 343/700 MS
6,002,367 A * 12/1999 Engblom et al. ...... 343/700 MS
6,054,953 A * 4/2000 Lindmark ............ 343/700 MS
6,111,544 A * 8/2000 Dakeya et al. ........ 343/700 MS
6,114,996 A * 9/2000 Nghiem ............... 343/700 MS
6,424,300 B1 * 7/2002 Sanford et al. .............. 343/702
6,795,027 B2 * 9/2004 Boyle ......................... 343/702
7,109,921 B2 * 9/2006 Leelaratne ........... 343/700 MS

* cited by examiner

*Primary Examiner*—Yuwen Pan

(57) ABSTRACT

A wireless terminal comprises a ground conductor (1102) and a transceiver coupled to an antenna feed, the antenna feed being coupled directly to the ground conductor (1102). In one embodiment the ground conductor is a conducting case (1102). The coupling may be via a parallel plate capacitor (504) formed by a plate (506) and a surface (1108) of the case (1102). The case (1102) acts as an efficient, wideband radiator, eliminating the need for a separate antenna. In a modification of this embodiment a slot (1112) is provided to increase the resistance of the case (1102) as seen by the transceiver, thereby increasing the radiating bandwidth of the terminal.

11 Claims, 10 Drawing Sheets

WIRELESS TERMINAL

The present invention relates to a wireless terminal, for example a mobile phone handset.

Wireless terminals, such as mobile phone handsets, typically incorporate either an external antenna, such as a normal mode helix or meander line antenna, or an internal antenna, such as a Planar Inverted-F Antenna (PIFA) or similar.

Such antennas are small (relative to a wavelength) and therefore, owing to the fundamental limits of small antennas, narrowband. However, cellular radio communication systems typically have a fractional bandwidth of 10% or more. To achieve such a bandwidth from a PIFA for example requires a considerable volume, there being a direct relationship between the bandwidth of a patch antenna and its volume, but such a volume is not readily available with the current trends towards small handsets. Hence, because of the limits referred to above, it is not feasible to achieve efficient wideband radiation from small antennas in present-day wireless terminals.

A further problem with known antenna arrangements for wireless terminals is that they are generally unbalanced, and therefore couple strongly to the terminal case. As a result a significant amount of radiation emanates from the terminal itself rather than the antenna.

An object of the present invention is to provide a wireless terminal having efficient radiation properties over a wide bandwidth.

According to the present invention there is provided a wireless terminal comprising a ground conductor and a transceiver coupled to an antenna feed, wherein the antenna feed is coupled to the ground conductor.

The present invention is based upon the recognition, not present in the prior art, that the impedances of an antenna and a wireless handset are similar to those of an asymmetric dipole, which are separable, and on the further recognition that the antenna impedance can be replaced with a non-radiating coupling element.

Embodiments of the present invention will now be described, by way of example, with reference to the accompanying drawings, wherein.

In the drawings the same reference numerals have been used to indicate corresponding features.

Figure 1:
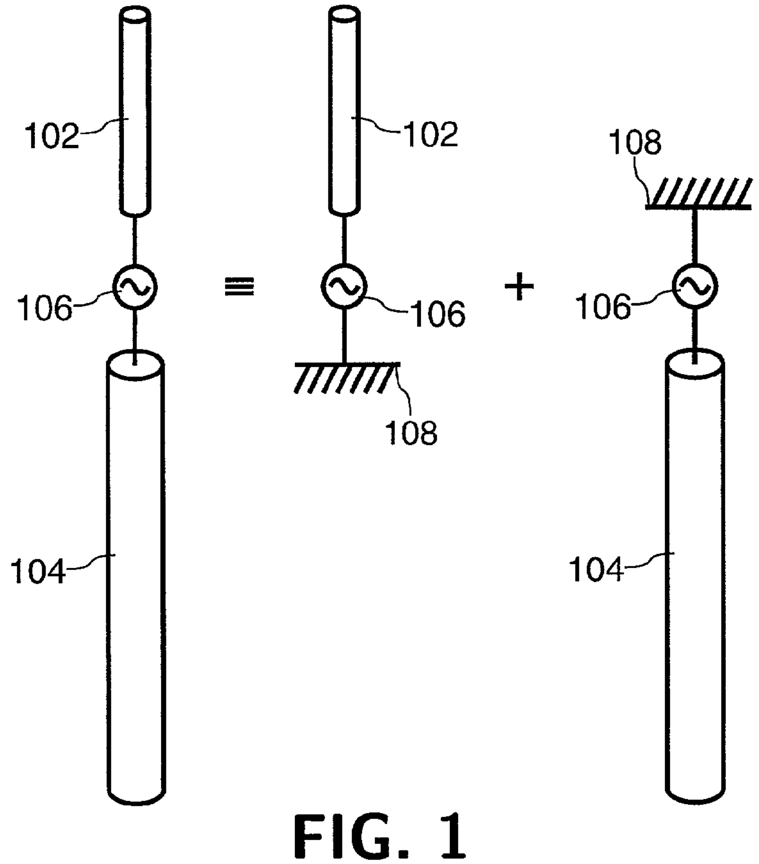
FIG. 1 shows a model of an asymmetrical dipole antenna, representing the combination of an antenna and a wireless terminal.

FIG. 1 shows a model of the impedance seen by a transceiver, in transmit mode, in a wireless handset at its antenna feed point. The impedance is modelled as an asymmetrical dipole, where the first arm 102 represents the impedance of the antenna and the second arm 104 the impedance of the handset, both arms being driven by a source 106. As shown in the figure, the impedance of such an arrangement is substantially equivalent to the sum of the impedance of each arm 102, 104 driven separately against a virtual ground 108. The model could equally well be used for reception by replacing the source 106 by an impedance representing that of the transceiver, although this is rather more difficult to simulate.

Figure 2:
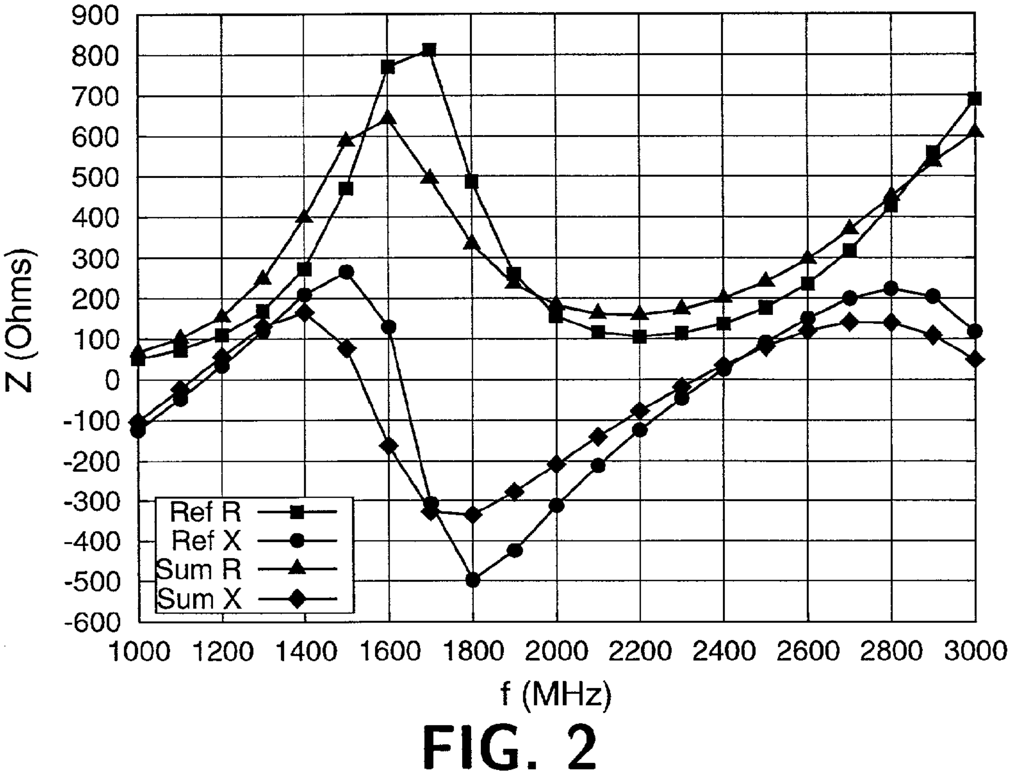
FIG. 2 is a graph demonstrating the separability of the components of the impedance of an asymmetrical dipole.

The validity of this model was checked by simulations using the well-known NEC (Numerical Electromagnetics Code) with the first arm 102 having a length of 40 mm and a diameter of 1 mm and the second arm 104 having a length of 80 mm and a diameter of 1 mm. FIG. 2 shows the results for the real and imaginary parts of the impedance (R+jX) of the combined arrangement (Ref R and Ref X) together with results obtained by simulating the impedances separately and summing the result. It can be seen that the results of the simulations are quite close. The only significant deviation is in the region of half-wave resonance, when the impedance is difficult to simulate accurately.

Figure 3:
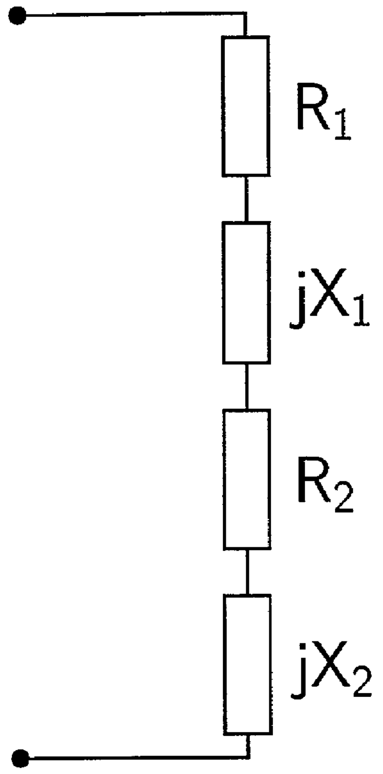
FIG. 3 is an equivalent circuit of the combination of a handset and an antenna.

An equivalent circuit for the combination of an antenna and a handset, as seen from the antenna feed point, is shown in FIG. 3. $R_1$ and $jX_1$ represent the impedance of the antenna, while $R_2$ and $jX_2$ represent the impedance of the handset. From this equivalent circuit it can be deduced that the ratio of power radiated by the antenna, $P_1$, and the handset, $P_2$, is given by $$\frac{P_1}{P_2} = \frac{R_1}{R_2}$$

If the size of the antenna is reduced, its radiation resistance $R_1$ will also reduce. If the antenna becomes infinitesimally small its radiation resistance $R_1$ will fall to zero and all of the radiation will come from the handset. This situation can be made beneficial if the handset impedance is suitable for the source 106 driving it and if the capacitive reactance of the infinitesimal antenna can be minimised by increasing the capacitive back-coupling to the handset.

Figure 4:
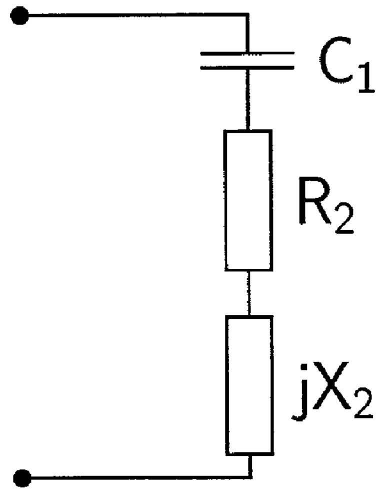
FIG. 4 is an equivalent circuit of a capacitively back-coupled handset.

With these modifications, the equivalent circuit is modified to that shown in FIG. 4. The antenna has therefore been replaced with a physically very small back-coupling capacitor, designed to have a large capacitance for maximum coupling and minimum reactance. The residual reactance of the back-coupling capacitor can be tuned out with a simple matching circuit. By correct design of the handset, the resulting bandwidth can be much greater than with a conventional antenna and handset combination, because the handset acts as a low Q radiating element (simulations show that a typical Q is around 1), whereas conventional antennas typically have a Q of around 50.

Figure 5:
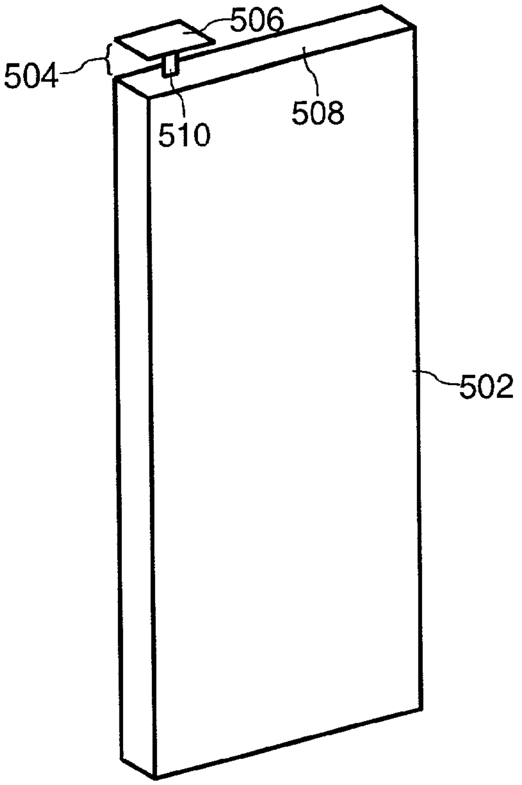
FIG. 5 is a perspective view of a basic capacitively back-coupled handset.

A basic embodiment of a capacitively back-coupled handset is shown in FIG. 5. A handset 502 has dimensions of 10×40×ϕmm, typical of modern cellular handsets. A parallel plate capacitor 504, having dimensions 2×10×10 mm, is formed by mounting a 10×10 mm plate 506 2 mm above the top edge 508 of the handset 502, in the position normally occupied by a much larger antenna. The resultant capacitance is about 0.5 pF, representing a compromise between capacitance (which would be increased by reducing the separation of the handset 502 and plate 504) and coupling effectiveness (which depends on the separation of the handset 502 and plate 504). The capacitor is fed via a support 510, which is insulated from the handset case 502.

Figure 6:
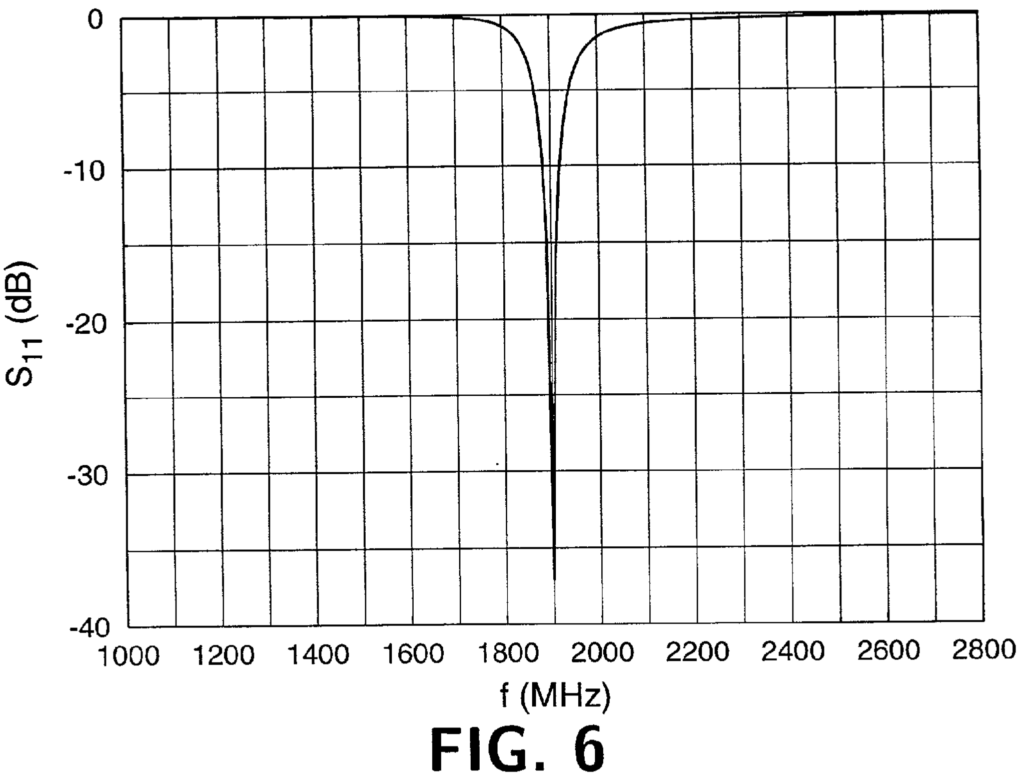
FIG. 6 is a graph of simulated return loss $S_{11}$ in dB against frequency f in MHz for the handset of FIG. 5.
Figure 7:
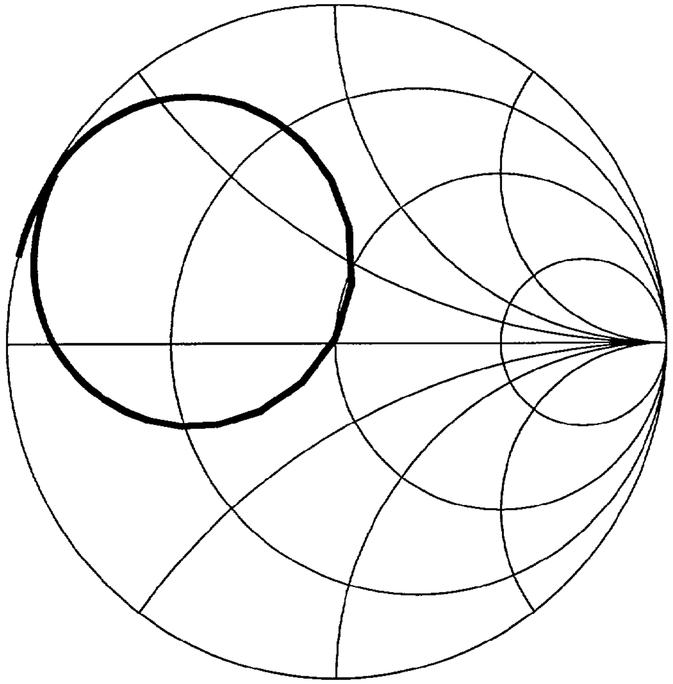
FIG. 7 is a Smith chart showing the simulated impedance of the handset of FIG. 5 over the frequency range 1000 to 2800 MHz.

The return loss $S_{11}$ of this embodiment after matching was simulated using the High Frequency Structure Simulator (HFSS), available from Ansoft Corporation, with the results shown in FIG. 6 for frequencies f between 1000 and 2800 MHz. A conventional two inductor "L" network was used to match at 1900 MHz. The resultant bandwidth at 7 dB return loss (corresponding to approximately 90% of input power radiated) is approximately 60 MHz, or 3%, which is useful but not as large as was required. A Smith chart illustrating the simulated impedance of this embodiment over the same frequency range is shown in FIG. 7.

Figure 8:
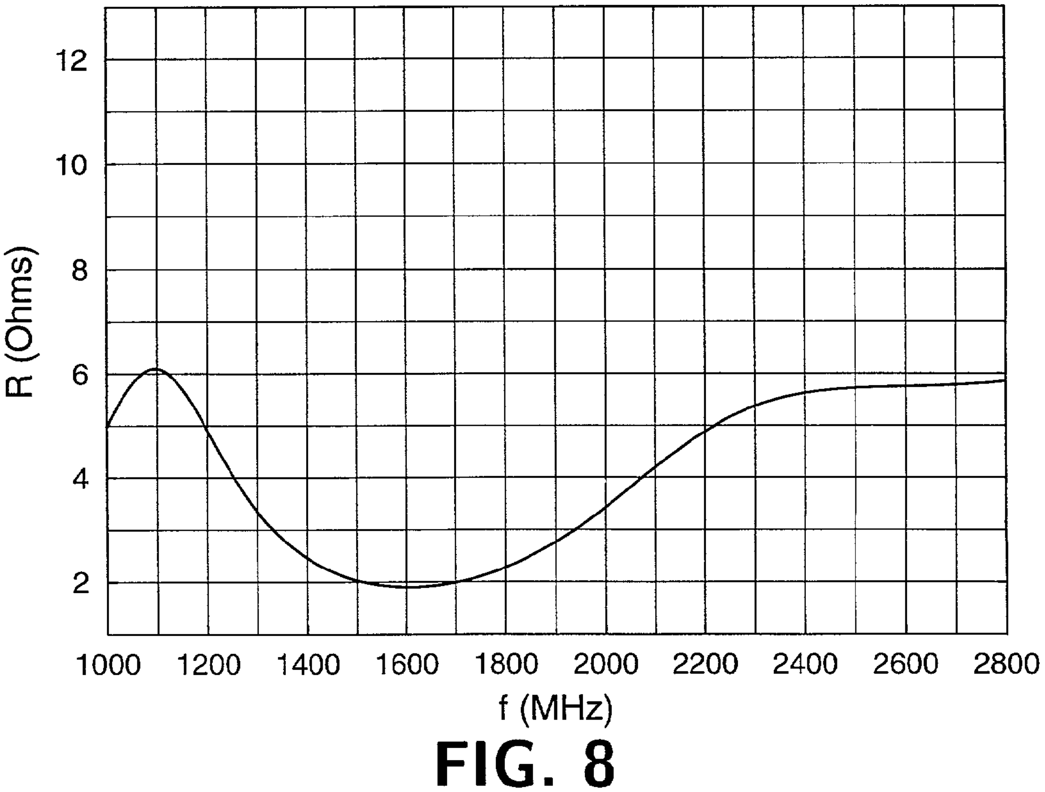
FIG. 8 is a graph showing the simulated resistance of the handset of FIG. 5.

The low bandwidth is because the handset 502 presents an impedance of approximately 3-j90Ω at 1900 MHz. FIG. 8 shows the resistance variation, over the same frequency range as before, simulated using HFSS. This can be improved by redesigning the case to increase the resistance.

Figure 9:
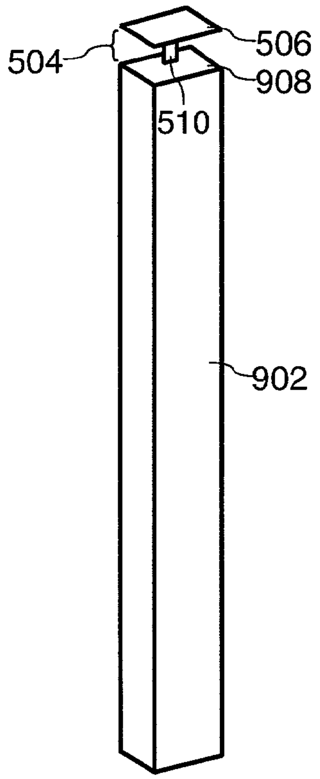
FIG. 9 is a perspective view of a narrow capacitively back-coupled handset.
Figure 10:
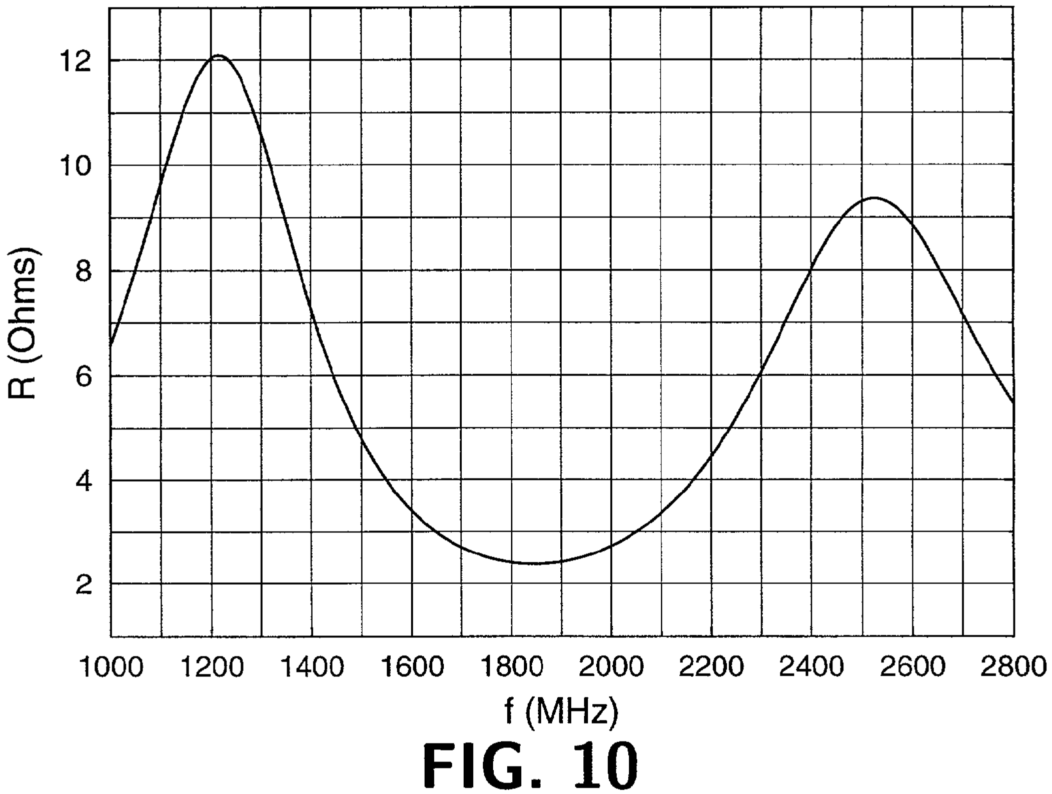
FIG. 10 is a graph showing the simulated resistance of the handset of FIG. 9.

One way in which this can be done is to reduce the width of the handset 502, since the resistance will increase in much the same way as that of a dipole when its radius is decreased. FIG. 9 shows a second embodiment having a narrow capacitively back-coupled handset 902. The handset 902 has dimensions of 10×10×100 mm, while the dimensions of the capacitor 504, formed from the plate 506 and top surface 908 of the handset 902, and the support 510 are unchanged from the previous embodiment. Simulations were again performed to determine the resistance variation of this embodiment, with the results shown in FIG. 10. This clearly demonstrates that use of a narrow handset provides a wider bandwidth where the resistance is higher than that of the basic configuration. The length of the handset could be optimised to give a wide bandwidth centered on a particular frequency, by shifting the resonant frequencies of the structure. For a fixed length handset, a horizontal slot (i.e. a slot across the width of the handset) could be used for the purpose of electrically shortening or lengthening the handset.

Figure 11:
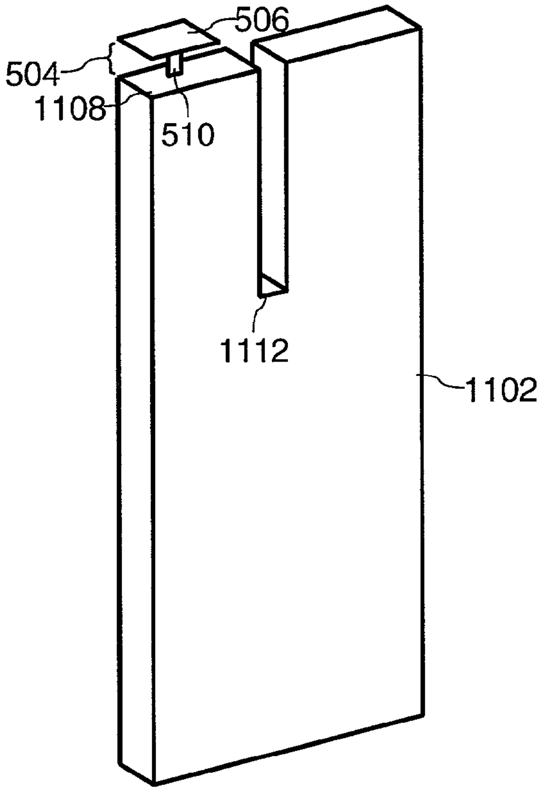
FIG. 11 is a perspective view of a slotted capacitively back-coupled handset.

An alternative way of increasing the resistance of the case is the insertion of a vertical slot (i.e. a slot parallel to the length, or major axis, of the handset). FIG. 11 shows a third embodiment having a slotted capacitively back-coupled handset 1102, with a 33 mm deep slot 1112 in the case, together with a capacitor 504. The dimensions of the capacitor 504, formed from the plate 506 and top surface 1108 of the handset 1102, and the support 510 are unchanged from the previous embodiments. The presence of the slot 1112 significantly increases the resistance of the case, as seen by the transceiver, in the region of 1900 MHz, allowing the low-Q case to be matched to 50Ω without a significant loss of bandwidth.

Figure 12:
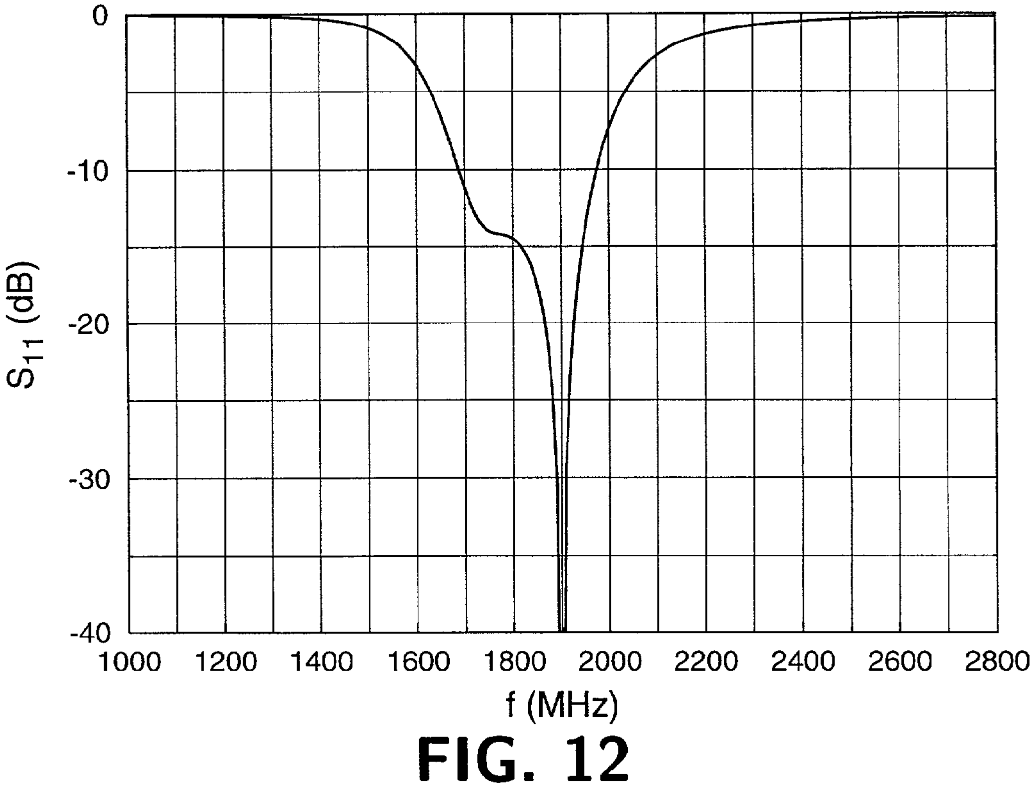
FIG. 12 is a graph of simulated return loss $S_{11}$ in dB against frequency f in MHz for the handset of FIG. 11.
Figure 13:
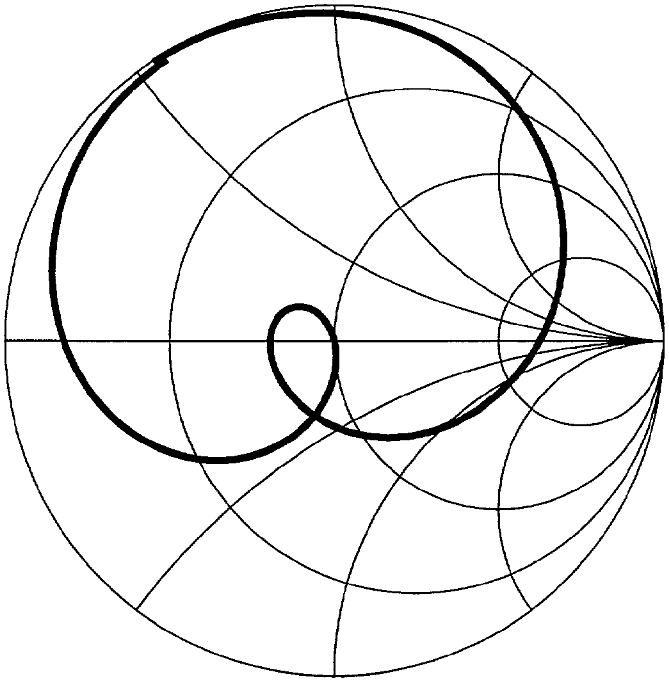
FIG. 13 is a Smith chart showing the simulated impedance of the handset of FIG. 11 over the frequency range 1000 to 2800 MHz.

The return loss $S_{11}$ of this embodiment was again simulated using HFSS, with the results shown in FIG. 12 for frequencies f between 1000 and 2800 MHz, using a similar two inductor matching network to that used for the basic embodiment. The resultant bandwidth at 7 dB return loss is greatly improved at approximately 350 MHz, or 18%, which is approaching that required to cover UMTS and DCS 1800 bands simultaneously. A Smith chart illustrating the simulated impedance of this embodiment over the same frequency range is shown in FIG. 13.

Figure 14:
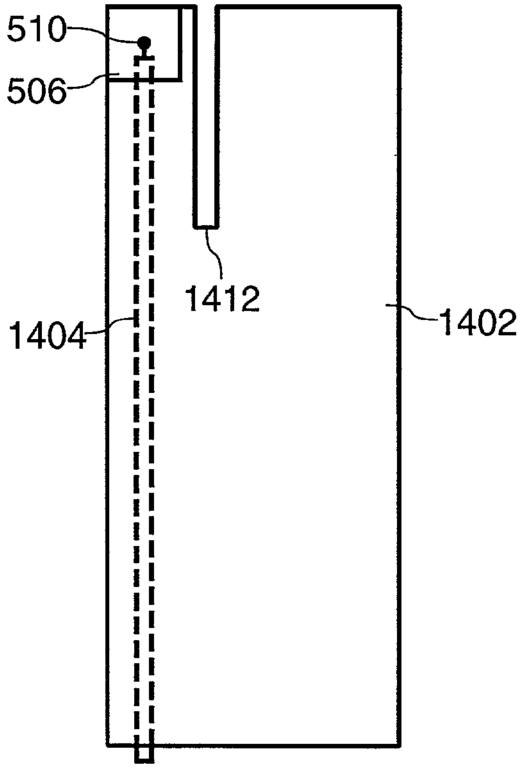
FIG. 14 is a plan view of a capacitively back-coupled test piece.

A test piece was produced to verify the practical application of the simulation results presented above. FIG. 14 is a plan view of the test piece, which comprises a copper ground plane 1402 having dimensions 40×100 mm on a 0.8 mm thick FR4 circuit board (with a measured dielectric constant of 4.1). A 3×29.5 mm slot 1412 is provided in the ground plane and a 10×10 mm plate 506 is located 2 mm above the corner of the ground plane 1402. The plate and co-extensive portion of the ground plane 1402 form a parallel plate capacitor, as in the embodiments described above. The capacitor is fed via a co-axial cable 1404 attached to the rear surface of the circuit board and a vertical pin 510.

Figure 15:
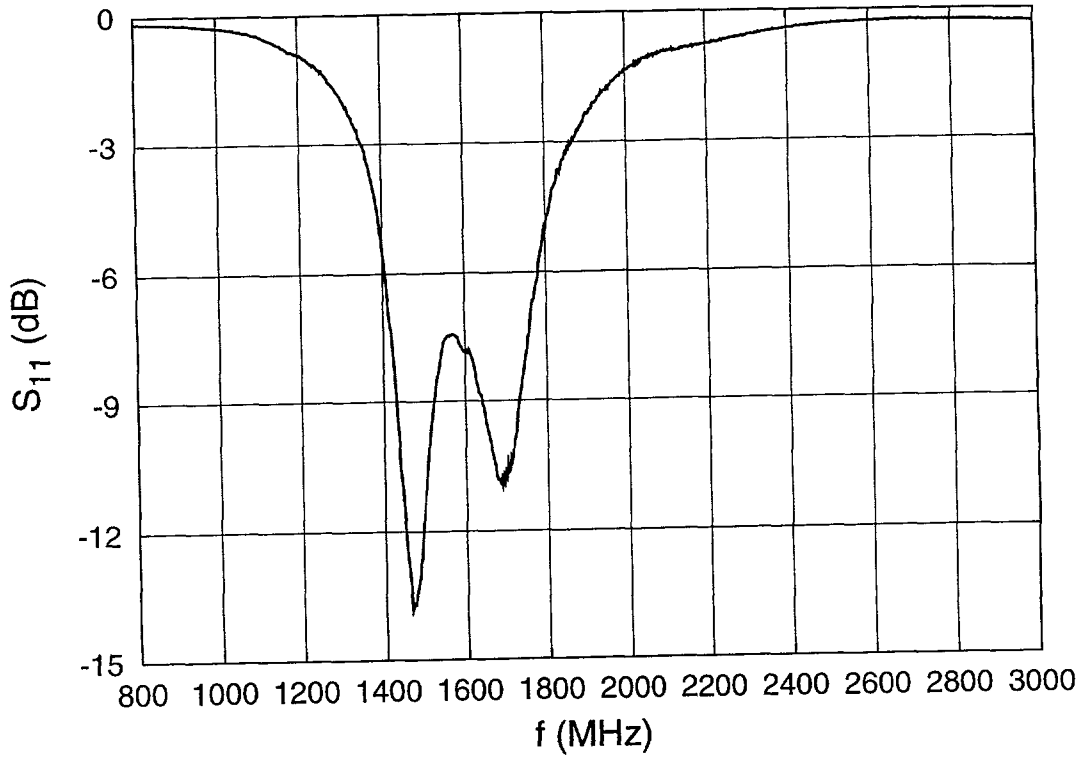
FIG. 15 is a graph of measured return loss $S_{11}$ in dB against frequency f in MHz for the test piece of FIG. 14.
Figure 16:
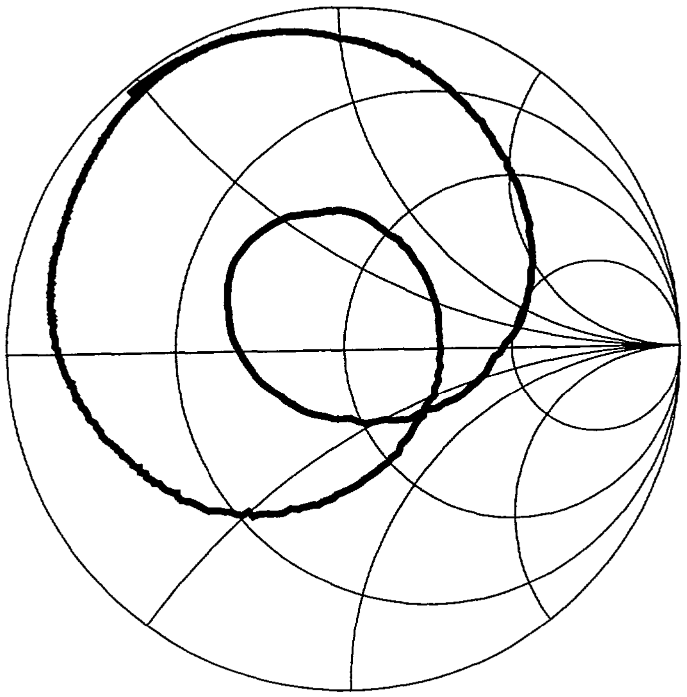
FIG. 16 is a Smith chart showing the measured impedance of the test piece of FIG. 14 over the frequency range 800 to 3000 MHz.

The return loss $S_{11}$ of this embodiment was measured without matching, which was then added in simulations. The matching added was a 3.5 nH series inductor and a 4 nH shunt inductor, similar to that used in the simulations described above. Results are shown in FIG. 15 for frequencies f between 800 and 3000 MHz. The resultant bandwidth at 7 dB return loss is approximately 350 MHz centered at 1600 MHz, or 22%, which is approximately the fractional bandwidth required to cover UMTS and DCS 1800 bands simultaneously. A Smith chart illustrating the impedance of this embodiment over the same frequency range is shown in FIG. 16.

The embodiments disclosed above are based on capacitive coupling. However, any other sacrificial (non-radiating) coupling element could be used instead, for example inductive coupling. Also, the coupling element could be altered in order to aid impedance matching. For example, capacitive coupling could be achieved via an inductive element which has the advantage of requiring no further matching components.

Figure 17:
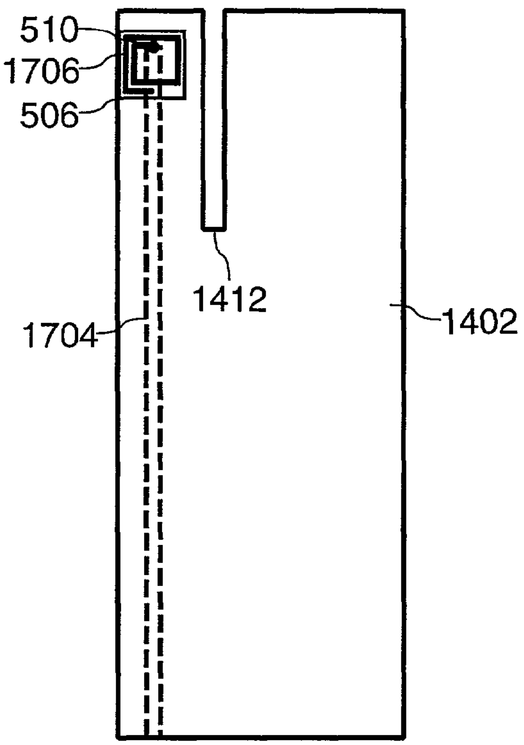
FIG. 17 is a plan view of a capacitively back-coupled test piece using an inductive element.

As an example of this latter technique a further test piece was produced, illustrated in plan view in FIG. 17. This piece is similar to that shown in FIG. 14, with the difference that the plate 506 is slightly offset from the corner of the ground plane 1402 and is no longer completely metallised: instead a spiral track 1706 is provided, connected at one end to the feed pin 501. The length of the track 1706 is chosen to provide resonance at the required frequency, approximately 1600 MHz in this embodiment. The track 1706 is fed via a stripline 1704 on the rear surface of the circuit board.

Figure 18:
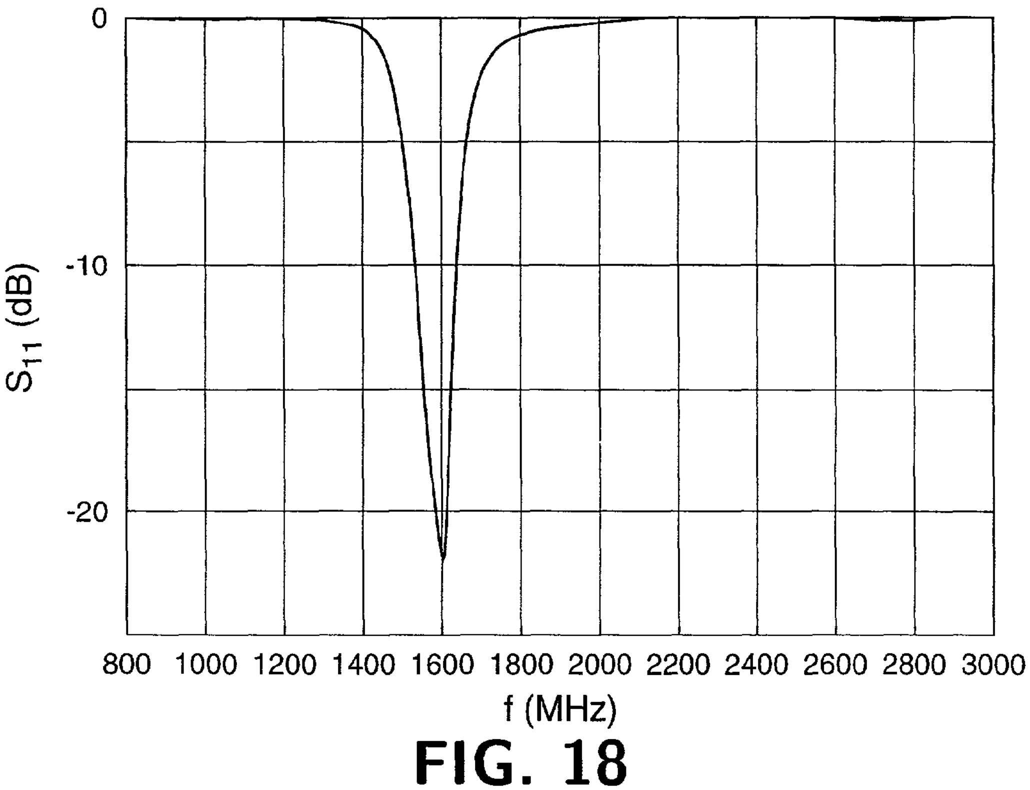
FIG. 18 is a graph of measured return loss $S_{11}$ in dB against frequency f in MHz for the test piece of FIG. 17.
Figure 19:
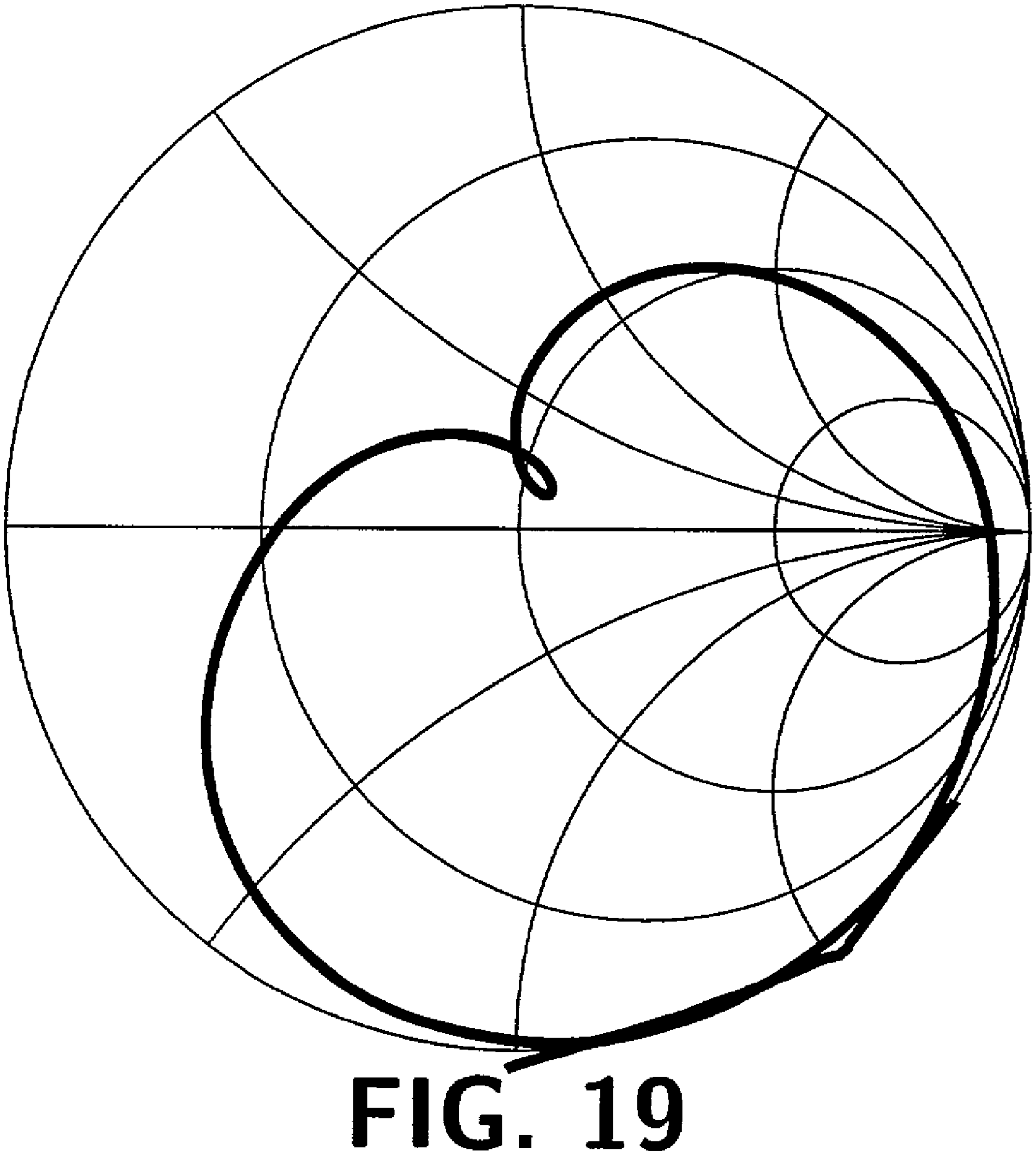
FIG. 19 is a Smith chart showing the measured impedance of the test piece of FIG. 17 over the frequency range 800 to 3000 MHz.

The return loss $S_{11}$ of this embodiment was measured without matching. Results are shown in FIG. 18 for frequencies f between 800 and 3000 MHz. The resultant bandwidth at 7 dB return loss is approximately 135 MHz centered at 1580 MHz, or 9%, and it is believed that this bandwidth could be improved significantly by further optimisation and matching. A Smith chart illustrating the impedance of this embodiment over the same frequency range is shown in FIG. 19.

In the above embodiments a conducting handset case has been the radiating element. However, other ground conductors in a wireless terminal could perform a similar function.

Examples include conductors used for EMC shielding and an area of Printed Circuit Board (PCB) metallisation, for example a ground plane.

From reading the present disclosure, other modifications will be apparent to persons skilled in the art. Such modifications may involve other features which are already known in the design, manufacture and use of wireless terminals and component parts thereof, and which may be used instead of or in addition to features already described herein. Although claims have been formulated in this application to particular combinations of features, it should be understood that the scope of the disclosure of the present application also includes any novel feature or any novel combination of features disclosed herein either explicitly or implicitly or any generalisation thereof, whether or not it relates to the same invention as presently claimed in any claim and whether or not it mitigates any or all of the same technical problems as does the present invention. The applicants hereby give notice that new claims may be formulated to such features and/or combinations of features during the prosecution of the present application or of any further application derived therefrom.

In the present specification and claims the word "a" or "an" preceding an element does not exclude the presence of a plurality of such elements. Further, the word "comprising" does not exclude the presence of other elements or steps than those listed.

The invention claimed is:

1. A wireless terminal comprising a ground conductor and a transceiver coupled to an antenna feed, wherein the antenna feed is capacitively coupled to the ground conductor by means of a conducting plate separate from and opposed to a portion of the ground conductor to form a capacitor, the non-radiating conducting plate being configured so that the capacitor has a capacitance to maximize coupling and minimize reactance such that all of radiation from the wireless terminal comes from the ground conductor, the conducting plate being exclusively connected to a support that is at least partially located between the conducting plate and the ground conductor, the conducting plate of the capacitor being fed via the support, the support being electrically insulated from the ground conductor that functions as a radiator.

2. A terminal as claimed in claim 1, wherein the antenna feed is coupled to the ground conductor via the capacitor.

3. A terminal as claimed in claim 2, wherein the capacitor is a parallel plate capacitor formed by the conducting plate and a portion of the ground conductor.

4. A terminal as claimed in claim 1, wherein the antenna feed is coupled to the ground conductor by capacitance between an inductive element and the ground conductor.

5. A terminal as claimed in claim 1, wherein a slot is provided in the ground conductor.

6. A terminal as claimed in claim 5, wherein the slot is parallel to the major axis of the terminal.

7. A terminal as claimed in claim 1, wherein the ground conductor is a handset case.

8. A terminal as claimed in claim 1, wherein the ground conductor is a printed circuit board ground plane.

9. A terminal as claimed in claim 1, wherein a matching network is provided between the transceiver and the antenna feed.

10. A terminal as claimed in claim 1, wherein the conducting plate is positioned relative to the ground conductor such that a major surface of the ground conductor is perpendicular to a major surface of the conducting plate.

11. A terminal as claimed in claim 10, wherein the ground conductor includes a slot that extends along the length of the ground conductor and is perpendicular to the major surface of the conducting plate.

* * * * *